US012496737B2

(12) United States Patent
Hallen

(10) Patent No.: US 12,496,737 B2
(45) Date of Patent: Dec. 16, 2025

(54) ROTARY TRIMMER

(71) Applicant: Alcon Inc., Fribourg (CH)

(72) Inventor: Paul R. Hallen, Colleyville, TX (US)

(73) Assignee: Alcon Inc., Fribourg (CH)

( * ) Notice: Subject to any disclaimer, the term of this patent is extended or adjusted under 35 U.S.C. 154(b) by 157 days.

(21) Appl. No.: 18/434,223

(22) Filed: Feb. 6, 2024

(65) Prior Publication Data

US 2024/0261990 A1 Aug. 8, 2024

Related U.S. Application Data

(60) Provisional application No. 63/483,780, filed on Feb. 8, 2023.

(51) Int. Cl.

| | |
|---|---|
| ***B26B 19/14*** | (2006.01) |
| ***B26B 19/16*** | (2006.01) |
| ***B26B 19/38*** | (2006.01) |
| ***B26B 19/44*** | (2006.01) |
| ***B26B 19/46*** | (2006.01) |

(52) U.S. Cl.

CPC .......... *B26B 19/148* (2013.01); *B26B 19/141* (2013.01); *B26B 19/16* (2013.01); *B26B 19/388* (2013.01); *B26B 19/44* (2013.01); *B26B 19/46* (2013.01)

(58) Field of Classification Search

CPC ..... B26B 19/148; B26B 19/141; B26B 19/16; B26B 19/388; B26B 19/44; B26B 19/46

See application file for complete search history.

(56) References Cited

U.S. PATENT DOCUMENTS

| | | | | |
|---|---|---|---|---|
| 3,224,437 A | | 12/1965 | Hardgrove | |
| 3,374,791 A | | 3/1968 | Thomas | |
| 3,731,379 A | * | 5/1973 | Williams | B26B 19/148 30/29.5 |
| 3,925,888 A | * | 12/1975 | Bozsanyi | B26B 19/148 30/29.5 |
| 4,441,485 A | | 4/1984 | Reynolds | |
| 5,012,576 A | * | 5/1991 | Johannesson | B26B 19/148 30/29.5 |
| 5,474,532 A | | 12/1995 | Steppe | |
| 5,533,266 A | * | 7/1996 | Kelman | A61B 18/203 132/200 |
| 5,916,150 A | | 6/1999 | Sillman | |
| 6,067,714 A | * | 5/2000 | Taylor | B26B 19/148 30/29.5 |
| 6,151,785 A | * | 11/2000 | Morris | B26B 19/148 30/206 |
| 6,155,987 A | | 12/2000 | Scherl | |
| 6,527,736 B1 | | 3/2003 | Attinger | |
| 9,119,744 B2 | | 9/2015 | Wellen | |
| 10,537,472 B2 | | 1/2020 | Brennan | |

(Continued)

FOREIGN PATENT DOCUMENTS

| | | | | |
|---|---|---|---|---|
| CA | 3085355 A1 | * | 7/2019 | A61B 1/227 |
| CN | 211662109 U | | 10/2020 | |
| WO | 2014056451 A1 | | 4/2014 | |

*Primary Examiner* — Omar Flores Sanchez

(57) ABSTRACT

The present disclosure generally relates to instruments for neurotologic surgical procedures, and more particularly, instruments for shearing ear canal hairs having combined shearing, illumination, and vacuum functions. In certain embodiments, the instruments may further facilitate visualization of the ear canal during the shearing of ear canal hairs.

14 Claims, 8 Drawing Sheets

(56) References Cited

U.S. PATENT DOCUMENTS

| | | | | |
|---|---|---|---|---|
| 10,555,834 | B2 | 2/2020 | Charles | |
| 10,667,953 | B2 | 6/2020 | Hendricks | |
| 11,020,271 | B2 | 6/2021 | Valencia | |
| 11,717,439 | B2 | 8/2023 | Maschio | |
| 2009/0165303 | A1 * | 7/2009 | Burgess | B26B 19/28 30/29.5 |
| 2010/0064520 | A1 * | 3/2010 | Park | B26B 21/38 30/29.5 |
| 2012/0059224 | A1 * | 3/2012 | Wellen | A61B 1/227 600/200 |
| 2012/0179187 | A1 | 7/2012 | Loushin | |
| 2017/0340085 | A1 * | 11/2017 | Kindermann | B26B 19/141 |
| 2018/0194024 | A1 * | 7/2018 | Teteak | B26B 19/3886 |
| 2022/0175484 | A1 | 6/2022 | Brennan | |
| 2023/0058540 | A1 | 2/2023 | Charles | |
| 2025/0108529 | A1 * | 4/2025 | Deshpande | B26B 19/20 |

* cited by examiner

ROTARY TRIMMER

BACKGROUND

Anatomically, the human ear is divided into three distinct regions: the outer ear, the middle ear, and the inner ear. The outer ear and middle ear are divided by the tympanic membrane (i.e., the eardrum). The outer ear portion of the ear includes the pinna, or auricle, and the external auditory canal or tube (i.e., the ear canal). The middle ear, also known as the tympanic cavity, includes the ossicles and the eustachian tube. Meanwhile, the inner ear portion of the ear includes the cochlea, vestibule, and semicircular canals.

An ear speculum is typically used to assist in viewing and examining the ear canal and ear drum, which may be carried out prior to performing a neurotologic surgical procedure. An ear speculum is typically utilized in combination with an otoscope or other ear viewing device. One of the reasons for utilizing an ear speculum when examining the ear is to assist in providing a direct and clear view of the ear drum, which often times may be obstructed by hair (among other things) in the ear canal.

Transcanal endoscopic ear surgeries (TEES) are neurotologic procedures performed within the middle ear portion of the human ear. Such procedures are minimally invasive and differ from traditional ear procedures in that surgeons access the middle ear through the ear canal rather than through an incision behind ear. TEES procedures can be used to treat conditions such as acoustic neuroma, cholesteatoma, cholesterol granuloma, congenital or acquired ossicular chain fixation, congenital or acquired ossicular chain discontinuity, paraganglioma, ruptured eardrum, tympanosclerosis, and other otolaryngology conditions.

In a TEES procedure, an endoscope is inserted through the ear canal to access the middle ear. While using the endoscope to visualize the surgical area in the middle ear, the surgeon uses microsurgical instruments to perform the operation. One of the risks associated with TEES procedures is the risk of ear canal hairs dislodging or inadvertently being cut during the procedure and entering into the middle ear. Since hair in the ear canal is used to block dirt and debris from the ear drum, such hairs entering into the middle ear can cause infection and/or inflammation thereof.

Due to the size of conventional endoscopes and the dimensions of the average ear canal, it is not feasible for an ear speculum to be used in combination with an endoscope and any associated surgical instruments in order to pin down the hairs in the ear canal. Moreover, the addition of a speculum will cause there to be at least three or more instruments simultaneously used at one or more points during a TEES procedure (e.g., an endoscope, speculum, and microsurgical instrument), whereas the surgeon only has two hands to perform the procedure.

To minimize the risks associated with TEES procedures, pre-op procedures are often performed to cut and remove hair in the ear canal. Conventionally, the cutting and removing of ear canal hair is manually carried out using scissor shears, which can be both time consuming and taxing. Furthermore, the manual removal of the trimmed hair may not always be thorough, thereby increasing the chance that a trimmed hair may be missed and accidentally advanced into the middle ear during the surgical procedure.

SUMMARY

The present disclosure generally relates to instruments for neurotologic surgical procedures, and more particularly, instruments for shearing ear canal hairs and having combined trimming, illuminating, and vacuuming functions.

In certain embodiments, a rotary trimmer is provided. The rotary trimmer includes a base unit configured to be held by a user. The base unit has an opening at a distal end and a cover coupled to the opening. The cover has a plurality of slits formed near a distal end of the cover. The rotary trimmer includes a shearing assembly disposed within the base unit. The shearing assembly includes a blade at least partially disposed within the cover, a rotor coupled to the blade, and a driver configured to rotate the rotor, wherein rotating the rotor causes rotation of the blade. The rotary trimmer also includes one or more optical fibers disposed within the base unit and a port disposed at a proximal end of the base unit. The optical fibers may be configured for use in visualization of an external space distal to the cover. The port may be configured to be in fluid communication with a vacuum line. In certain embodiments, the vacuum line fluidly couples the port of the rotary trimmer to a vacuum source.

In certain embodiments, at least one the one or more optical fibers in the rotary trimmer is configured to project an illumination light. In other embodiments, at least one of the one or more optical fibers in the rotary trimmer is optically coupled with a camera at a distal end of the at least one optical fiber.

In certain embodiments, the one or more optical fibers comprise one or more illumination fibers configured to propagate illumination light and one or more image fibers configured to capture light and propagate images to a visualization system.

In certain embodiments, at least one of the one or more optical fibers is configured as a proximity sensor to detect one or more sensitive surfaces inside an ear canal space and to monitor a distance between the distal end of the cover and the one or more detected sensitive surfaces.

In certain embodiments, the rotary trimmer comprises a safety feedback feature to provide an audible and/or a visual notification to a user upon the proximity sensor detecting that the distal end of the cover is within a minimum threshold distance to the one or more sensitive surfaces inside the ear canal space. In some other embodiments, the rotary trimmer comprises a safety feedback feature to disable the shearing assembly upon the proximity sensor detecting that the distal end of the cover is within a minimum threshold distance to the one or more sensitive surfaces inside the ear canal space.

In certain embodiments, the cover further comprises one or more sections formed of a translucent or transparent material to facilitate transmission of light therethrough.

In certain embodiments, the blade of the rotary trimmer comprises a cylindrical body having a proximal end and a distal end, wherein the proximal end of the cylindrical body is coupled to the rotor, and wherein the distal end of the cylindrical body comprises a cutting surface formed along a circumference of an opening at the distal end of the cylindrical body. In certain embodiments, the blade further comprises a hollow cavity extending from the proximal end of the cylindrical body to the opening at the distal end of the cylindrical body, and wherein the one or more optical fibers are concentrically disposed within the hollow cavity relative to the cutting surface of the cylindrical body.

In certain embodiments, the blade of the rotary trimmer comprises a cylindrical body and one or more lateral blades extending laterally from an exterior surface of the cylindrical body, wherein each of the one or more lateral blades includes a lateral cutting surface disposed parallel with the exterior surface of the cylindrical body. In certain embodiments, each of the one or more lateral blades further comprise a distal cutting surface at a distal end of each of the one or more lateral blades, wherein the distal cutting surface extends perpendicular with the exterior surface of the cylindrical body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
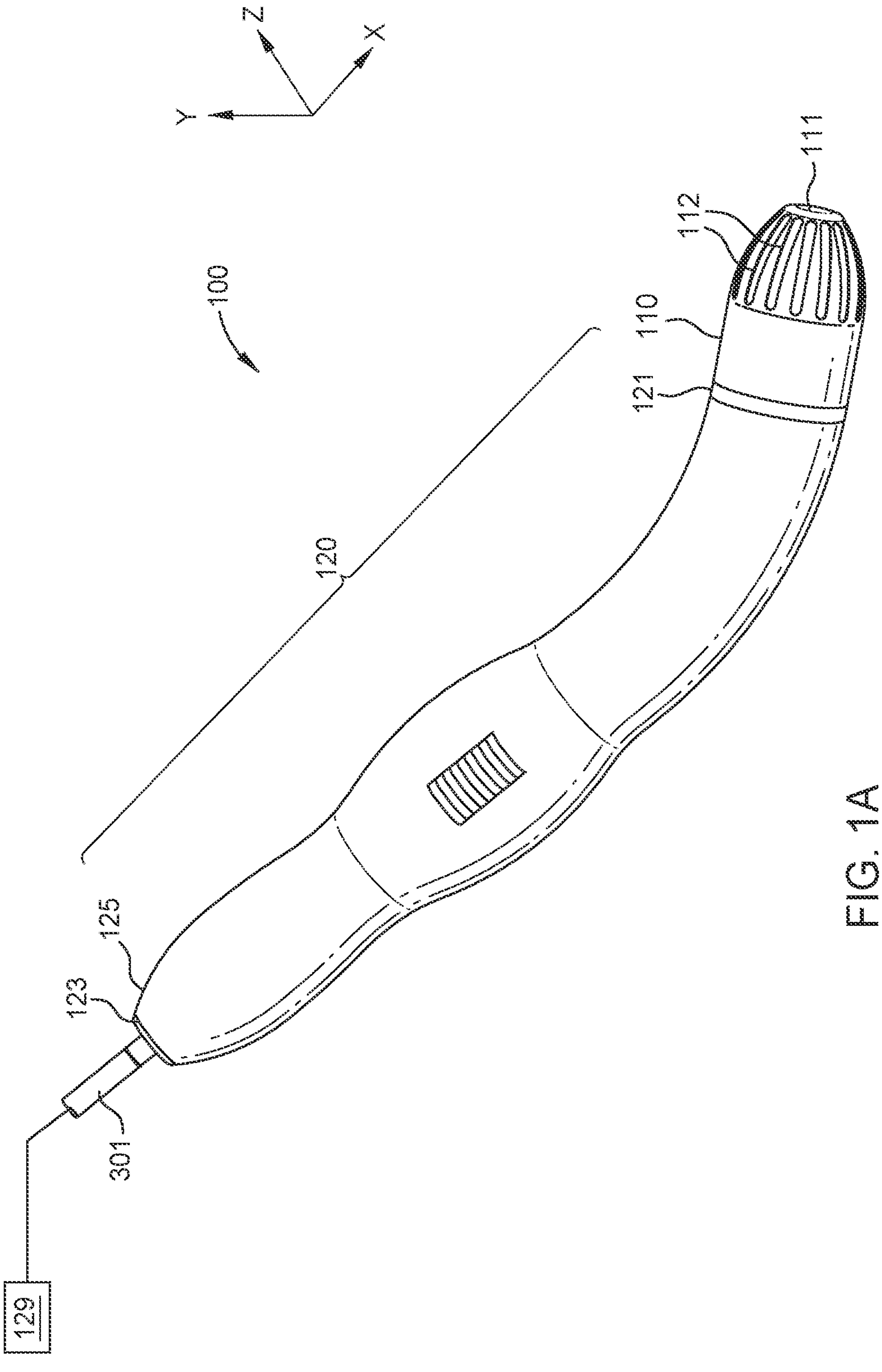
FIGS. 1A and 1B illustrate a perspective view and top view, respectively, of an exemplary rotary trimmer, according to some embodiments of the present disclosure.

The present disclosure generally relates to instruments for neurotologic surgical procedures, and more particularly, instruments for shearing ear canal hairs and having combined shearing, illuminating, and vacuuming functions.

In certain embodiments, a rotary trimmer includes a base unit comprising a shearing assembly, a vacuum source coupled to a port at a proximate end of the base unit, and a cover disposed at a distal end of the base unit and having a plurality of slits for ingress of ear canal hairs for shearing by the shearing assembly. In certain embodiments, the base unit may further include a semi-rigid flexing shaft near the distal end of the base unit to enable conformation of the distal end to a plurality of varying diameters and angles of an ear canal. In certain embodiments, the base unit further comprises one or more optical fibers. In certain embodiments, the one or more optical fibers may comprise an image fiber having a camera or other image sensor at a distal end thereof to facilitate imaging inside the ear. In certain embodiments, the one or more optical fibers may comprise an illumination fiber configured to project an illumination light into the outer ear (e.g. ear canal) of the patient.

According to certain aspects of the present disclosure, the rotary trimmer may be inserted by a user into the ear canal of a patient to shear and remove hair in the ear canal leading to the tympanic membrane. In certain embodiments, the one or more optical fibers provide otoscopic (e.g., imaging) functions for viewing the ear canal when the rotary trimmer is inserted therein. In certain embodiments, the one or more optical fibers may also transmit illumination light into the ear canal to provide enhanced visualization thereof during inspection and hair removal. Thus, the one or more optical fibers may facilitate improved guidance of the distal end of the rotary trimmer through the ear canal by the user when shearing ear canal hairs.

In certain embodiments, the one or more optical fibers may be a component of a safety or feedback mechanism for preventing inadvertent contacting or damaging of the tympanic membrane. For example, in certain embodiments, which may be combined with other embodiments herein, the one or more optical fibers may comprise a fiber optic proximity sensor for detecting (e.g., via light) sensitive surfaces of the ear, such as the tympanic membrane, and alerting the user when the distal end of the rotary trimmer is within a predetermined distance of the detected sensitive surface. In certain embodiments, upon detecting that the distal end of the rotary trimmer is within a minimum threshold distance of a detected sensitive surface, the blade of the rotary trimmer may be automatically disabled by a controller or actuator in communication therewith. In certain embodiments, the rotary trimmer may be further configured to automatically reactivate upon detecting that the distal end of the rotary trimmer has been repositioned outside of the minimum threshold distance of the detected sensitive surface.

According to some embodiments, when (e.g., as soon as) hair in the ear canal is cut by the blades of the rotary trimmer, the hair is suctioned away to prevent cut and loose strands of hair from falling towards the tympanic membrane. After hair is cut by the rotating blades in the rotary trimmer, the cut hair may be suctioned towards the base unit by a vacuum source coupled to the rotary trimmer.

Turning now to FIG. 1A, a perspective view of an exemplary rotary trimmer 100 is illustrated, according to certain embodiments described herein. As depicted, the rotary trimmer 100 includes a cover 110 removably coupled to a base unit 120. The cover 110 is disposed at a distal end 121 of the base unit 120 and includes a plurality of slits 112 disposed near a distal tip 111 of the cover 110. In the example of FIG. 1A, the cover 110 is substantially dome-shaped, though other morphologies are also contemplated. An interior region of the cover 110 is in fluid communication with an interior chamber of the base unit 120 such that portions of components within the base unit 120 may partially extend into the interior region of the cover 110 when the cover 110 is coupled to the base unit 120. Note that, as described herein, a distal end or portion of a component refers to the end or the portion that is closer to a patient's body during use thereof. On the other hand, a proximal end or portion of the component refers to the end or the portion that is distanced further away from the patient's body.

In certain embodiments, the base unit 120 comprises a hand piece near the distal end having an outer surface 128 configured to be held by a user, such as a surgeon or members of a surgical staff. For example, the base unit 120 may be ergonomically contoured to substantially fit and/or be held by the user. In certain embodiments, the outer surface may be textured or have one or more gripping features formed thereon, such as one or more grooves and/or ridges. The base unit may further comprise a switch 133 or toggle for activating the rotary trimmer 100. The base unit 120 may be made from any materials commonly used for such instruments and suitable for neurotologic surgical procedures. For example, the base unit 120 may be formed of a lightweight metallic material such as aluminum, a thermoplastic polymeric material, or other suitable material. In certain embodiments, the base unit 120 and/or components attached thereto may be sterilized and used in more than one surgical procedure. In other embodiments, the base unit 120 and/or components attached thereto may be single-use devices or components. In certain aspects, the cover 110 comprises a disposable single-use component that may be replaced every time the rotary trimmer 100 is used.

Figure 1B:
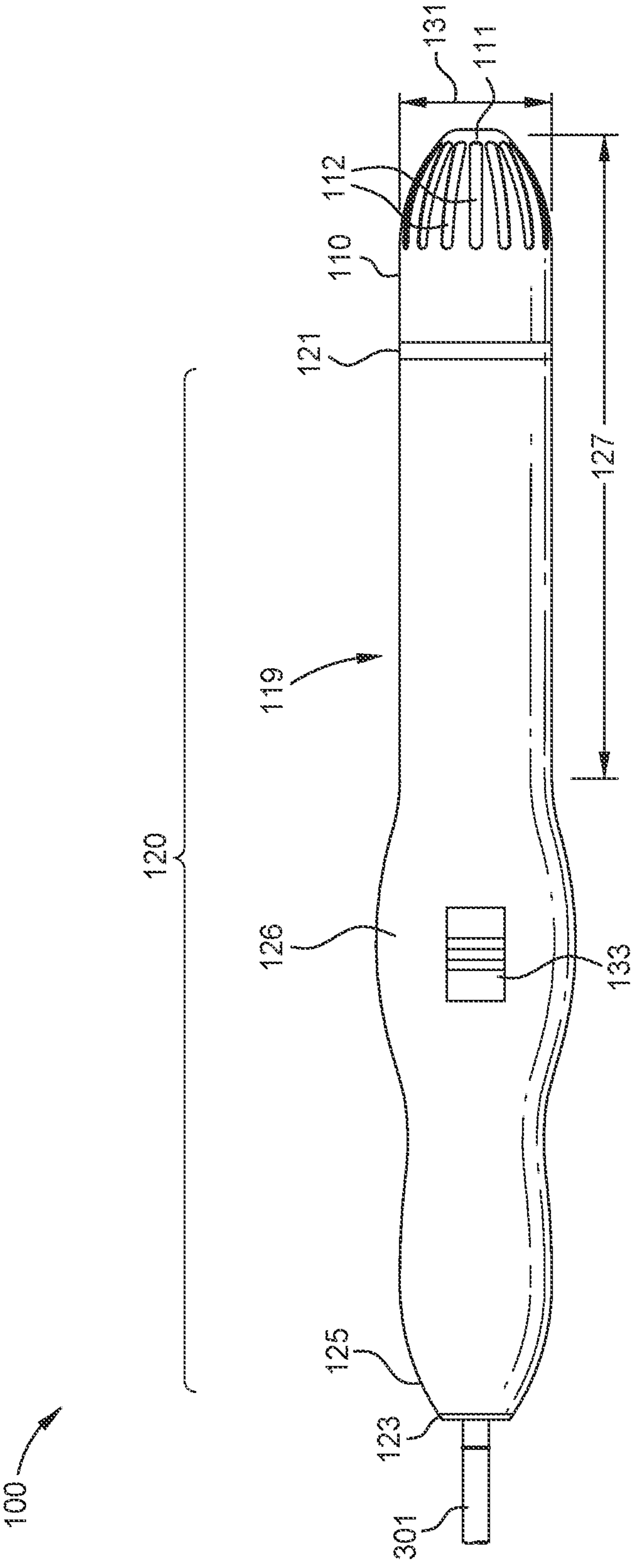

In certain embodiments, the base unit 120 may further comprise one or more ports 123 (e.g., one port 123 is depicted in FIGS. 1A and 1B) at the proximal end 125 thereof for one or more supply lines and/or cables to be routed into or coupled with the interior chamber of the base unit 120. For example, the port 123 may provide a connection between the base unit 120 and a vacuum line 301 fluidly coupled to a vacuum source 129 for suctioning of loose hair cut by the rotary trimmer 100. In certain embodiments, the port 123 may also provide a connection point for connecting an optical fiber to a visualization system, or to a light source for providing illumination light. In certain embodiments, the one or more ports 123 may provide a connection point for connecting the base unit 120 to a pneumatic or electrical power source to power the rotary trimmer 100. In certain embodiments, the one or more ports 123 may provide a connection point for connecting the base unit 120 to a console, such as a surgical console, which may comprise a pneumatic or electrical power source for powering the rotary trimmer 100 and/or a controller for controlling one or more functions of the rotary trimmer 100. In further embodiments, the rotary trimmer 100 may be configured as a portable handheld device disconnected from any console or systems. In such embodiments, components required for the trimming and suctioning of hair, as well as for facilitating imaging and/or illumination, may be integrated within the base unit 120 to form a portable handheld device.

FIG. 1B illustrates a top view of the rotary trimmer 100 in FIG. 1A, according to certain embodiments described herein. As shown, the base unit 120 comprises a portion 126 adjacent to a proximal end 125 of the base unit 120 and configured to be held by the user. The base unit 120 further comprises an elongated shaft 119 adjacent to the distal end 121 and to which the cover 110 removably couples.

The shaft 119 and the cover 110 removably coupled thereto may be sized and configured to be inserted into the ear canal of a patient to trim any hair therein. For example, the elongated shaft 119 and the cover 110 may together comprise a longitudinal length 127 sized to substantially match or be greater than the typical depth of the outer ear. When the shaft 119 and the cover 110 are inserted into the outer ear, the length 127 may be sufficient for the shaft 119 to extend throughout the ear canal such that the cover 110 may be positioned adjacent to the tympanic membrane of the patient. In certain embodiments, the longitudinal length 127 of the shaft 119 and the cover 110 may be sized between about 3 cm and about 15 cm, such as between about 3 cm and about 8 cm, and between about 9 cm and about 15 cm. In certain embodiments, the shaft 119 and/or cover 110 may further have cross-sectional dimensions (e.g., diameter(s)) sized to be slightly less than the typical diameter of the ear canal in the outer ear. In certain embodiments, the shaft 119 may have a diameter 131 between about 2 mm (millimeters) and about 6 mm, such as between about 2 mm and about 4 mm, between about 4 mm and about 5 mm, and between about 5 mm and about 6 mm. In other embodiments, the rotary trimmer 100 may have a larger or smaller lengths 127 and diameters 131 capable of still being inserted into the ear canal of a patient.

In certain embodiments, the elongated shaft 119 may be formed with a semi-ridged flexible construction to enable the elongated shaft 119 to conform to the diameter and nonlinear path of the ear canal in the outer ear. For example, the elongated shaft 119 may comprise a low density plastic, a medium density plastic, a polyurethane elastomer, a polyester elastomers, a polyimide, or a flexible metallic material such as nitinol.

Figures 1C, 1D:
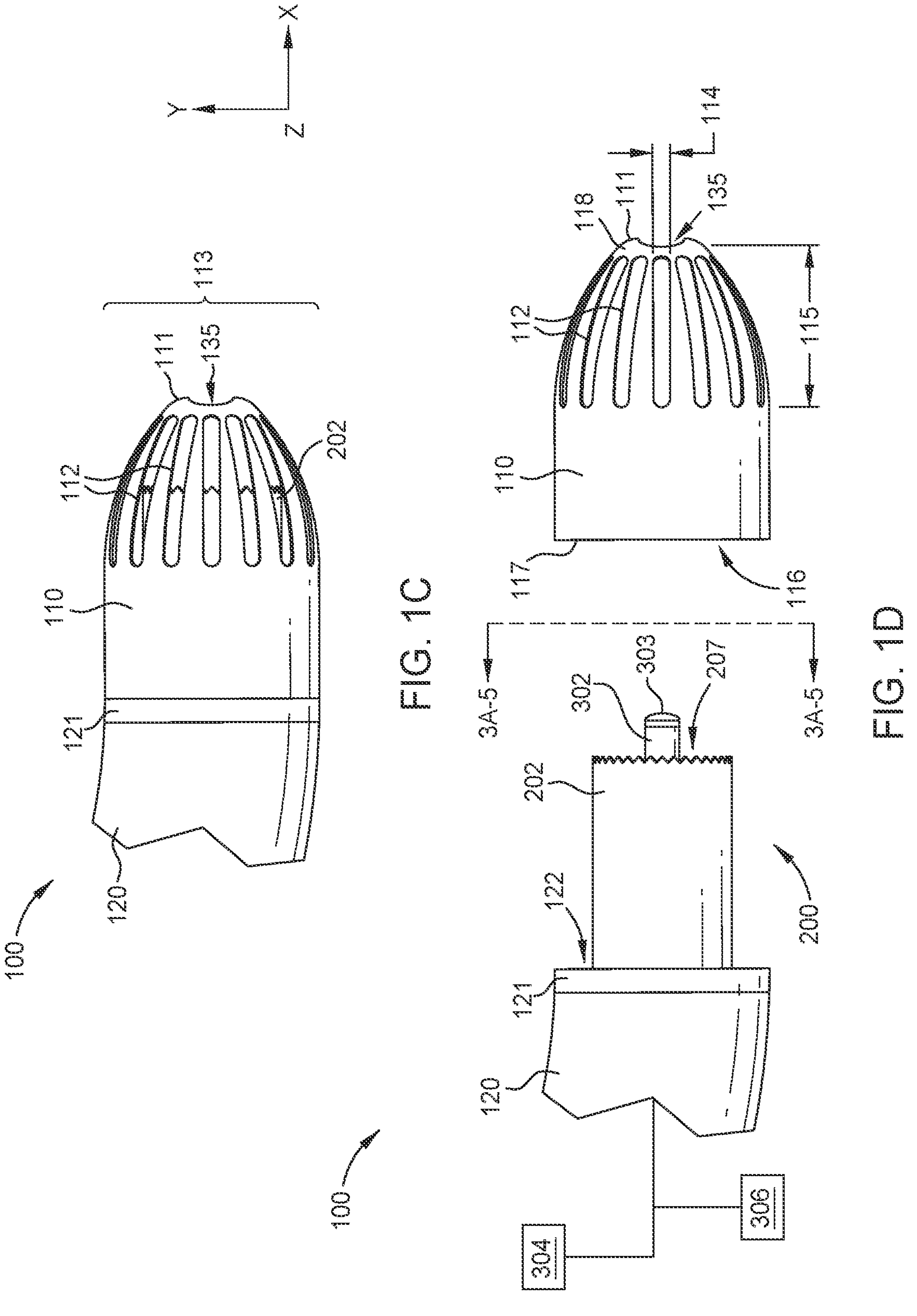
FIGS. 1C and 1D illustrate a first and second side view of a portion of the rotary trimmer depicted in FIGS. 1A and 1B, according to some embodiments of the present disclosure.

FIGS. 1C and 1D illustrate side views of the distal end 121 of the base unit 120 with the cover 110 attached and removed, respectively, according to certain embodiments described herein. FIGS. 1C and 1D are herein described together for clarity. As shown, the cover 110 is removably coupled to the distal end 121 of the base unit 120 and disposed over an opening 122 thereof. The cover 110 may have a tapered, dome-like profile between an opening 116 at a proximal end 117 of the cover 110 and the distal tip 111 of the cover 110 to enable the rotary trimmer 100 to better traverse the ear canal and to bring the cover 110 in contact with hair growing therein.

In certain embodiments, the distal tip 111 of the cover 110 may comprise a blunted or rounded end face 118 (e.g., the distal-most exterior surface) to protect the surfaces of the outer ear and tympanic membrane from inadvertent puncturing by the distal tip 111 when the rotary trimmer 100 is used inside the ear. As discussed above, the cover 110 is generally sized to navigate the rotary trimmer 100 through the ear canal. The cover 110 may therefore, like the shaft 119, have a diameter 131 between about 2 mm and about 5 mm, such as between about 2 mm and about 3 mm, between about 3 mm and about 4 mm, and between about 4 mm and about 5 mm. In other embodiments, the cover 110 may have a larger or smaller diameter while still coverable of being inserted into the ear canal of a patient.

The cover 110 includes a plurality of slits 112 formed near the distal tip 111 to receive hairs for cutting by the rotary trimmer 100 inside the cover 110. Each of the plurality of slits 112 may extend from substantially near the distal tip 111 to the proximal end 117 of the cover 110. In certain embodiments, the plurality of slits 112 may be incrementally disposed along an entire circumference of the cover 110 to receive hairs for cutting from all sides and angles of the cover 110 without having to reorient the position of the rotary trimmer 100. In certain embodiments, each of the plurality of slits 112 may include a width 114 sized between about 200 μm (micrometers) and about 500 μm, such as about 300 μm and about 400 μm. Each of the plurality of slits 112 may also include a length 115 sized between about 1 mm to about 3 mm. In one aspect, the plurality of slits 112 may be disposed between about 1 mm to about 3 mm from the distal tip 111 of the cover 110.

As shown in FIG. 1D, in certain embodiments, at least a portion of a tubular shearing body 202 and a portion of an optical fiber 302 extend from the opening 122 in the base unit 120 and are partially disposed within the interior portion of the cover 110 when the cover 110 is secured over the distal end 121 of the base unit 120. The shearing body 202 is configured to rotate to cut/shear ear canal hairs as they pass through the plurality of slits 112 in the cover 110. Meanwhile, the optical fiber 302 may generally comprise an image fiber and/or an illumination fiber in optical communication with a visualization system and/or a light source, respectively, for assisting the user in guiding the rotary trimmer 100 towards hair in the ear canal for cutting, as described below.

In certain embodiments, the optical fiber 302 may be operably coupled to a camera 304 or other image sensor of a visualization system at a proximal end thereof and be fitted with a lens or window at a distal end 303 thereof to enable digital image visualization of the ear canal for the user while the rotary trimmer 100 is in use. In certain embodiments, the optical fiber 302 and camera 304 (or other image sensor) may comprise components of a videoscope or an endoscope for facilitating live video feed of the exterior space in front of (e.g., distal to) the distal tip 111, such as the space inside the ear canal of the patient. Accordingly, in such embodiments, the optical fiber 302 and camera 304 enable the user to find and direct the distal end 121 of the rotary trimmer 100 towards hair in the ear canal for shearing. After the ear canal hair is cut, the camera 304 may also be used to inspect the cleared space to ensure that there is not any uncut or loose hair remaining.

In certain embodiments, the optical fiber 302 may be an illumination fiber coupled to a light source 306 and configured to relay illumination light. The illumination light may be used to enhance visualization of the ear canal for the user when utilizing the rotary trimmer 100. In certain embodiments, the optical fiber 302 is configured to function as both an illumination fiber and an image fiber, wherein illumination light relayed by the optical fiber 302 is utilized to enhance the imaging function thereof. In certain other embodiments, the optical fiber 302 is configured to function as only one of an illumination fiber or an image fiber. For example, since hair growth in the ear canal is somewhat accessible and can be seen by the naked eye under some circumstances, only illumination of the ear canal may be needed. In still other embodiments, the rotary trimmer 100 may comprise more than one optical fiber 302 for imaging, illumination, or performing both functions simultaneously by separate or the same fibers.

In certain embodiments where the optical fiber 302 is coupled to the camera 304, the camera 304 and optical fiber 302 may function as components of a safety feedback mechanism for preventing inadvertent contact with, and/or puncturing of, sensitive surfaces of the ear canal, including surfaces of the tympanic membrane. For example, the camera 304 and optical fiber 302 may together comprise an optical proximity sensor for automatically detecting, based on images captured by the camera 304, when the distal tip 111 of the cover 110 is within a minimum threshold distance of a sensitive surface in the ear canal. In certain embodiments, when the distal tip 111 is within the minimum threshold distance, an audible or visual warning notification or alert may be provided to the user, and/or the shearing assembly 200 may be automatically inactivated, in order to prevent contact of the rotary trimmer 100 with the sensitive surface(s) and any damage caused thereto. In certain embodiments, the feedback mechanism may be further configured to automatically reactivate the shearing assembly 200 once the rotary trimmer 100 is repositioned by the user such that the distal tip 111 is no longer within the minimum threshold distance of the detected sensitive surface(s) in the ear canal.

In certain embodiments, as shown in FIG. 1D, the optical fiber 302 may be suspended within and extend through an opening 207 of the shearing body 202 such that the optical fiber 302 is disposed concentrically relative to the shearing body 202 and substantially centered in the base unit 120 of the rotary trimmer 100. When in use, the shearing body 202 may therefore rotate or oscillate around the optical fiber 302 suspended within and through the opening 207 of the shearing body 202.

In certain embodiments, the optical fiber 302 may be fixed or slidably coupled within the base unit 120. For example, the optical fiber 302 may be slidably coupled relative to the base unit 120 such that optical fiber 302 may extend from and retract into the base unit 120. Accordingly, a user may selectively adjust the distance between a distal end 303 of the optical fiber 302 and the distal tip 111 of the cover 110. In certain aspects, the adjustability of the position of the distal end 303 of the optical fiber 302 may be used to dispose the distal end 303 of the optical fiber 302 in contact with an interior surface of the cover 110 proximate to the distal tip 111.

In embodiments having the optical fiber 302, the cover 110 may include one or more sections formed of a translucent or transparent material to enable the projecting of light and/or imaging from optical fiber 302 through the cover 110. In certain embodiments, the distal tip 111 of the cover 110 may be formed of a translucent or transparent material while the remaining portion of the cover 110 is formed of an opaque metal or plastic material. In other embodiments, the cover 110 may be entirely formed of a translucent or transparent material.

In further embodiments, as shown in FIGS. 1C and 1D, the distal tip 111 of the cover 110 may be formed with an opening 135 therein configured to allow illumination light from the distal end 303 of the optical fiber 302 to be projected through, or to allow images to be received by the optical fiber 302. The opening 135 at the distal tip 111 of the cover 110 may thus be used to facilitate illumination or imaging by the optical fiber 302 with an unobstructed view or access to the external space distal to of the distal tip 111 of the cover 110.

Figure 2A:
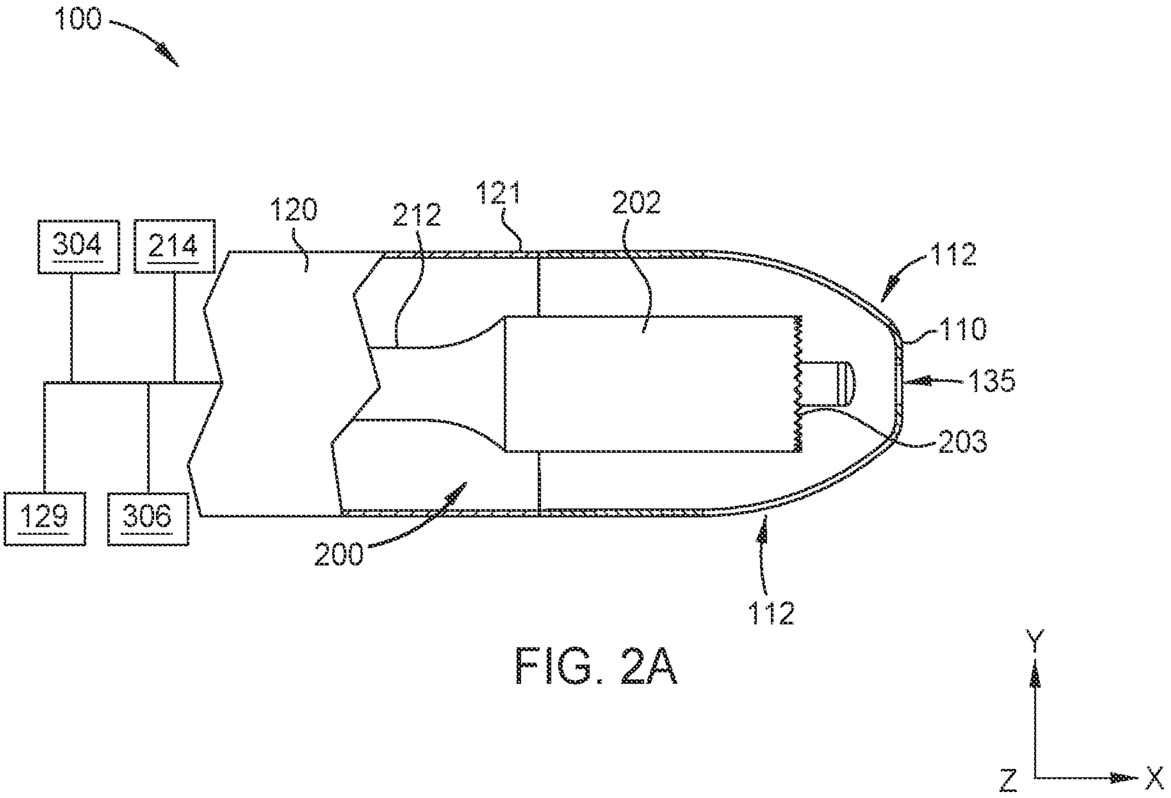
FIG. 2A illustrates a partial cross-sectional side view of a portion of an exemplary configuration of the rotary trimmer depicted in FIGS. 1A-1D, according to some embodiments of the present disclosure.

FIG. 2A illustrates a partial cross-sectional side view of a portion of an exemplary configuration of the rotary trimmer 100, according to some embodiments of the present disclosure. As shown, the rotary trimmer 100 includes a rotor 212 operably coupled to the shearing body 202 at a distal end of the rotor 212, and a driver 214, such as an electromechanical motor, at a proximal end of the rotor 212. Together, the driver 214, rotor 212, and shearing body 202 may be referred to as a shearing assembly 200. In this arrangement, the driver 214, upon being activated, rotates or oscillates the rotor 212 disposed inside the base unit 120, which in turn rotates or oscillates the shearing body 202.

At least a portion of the shearing body 202 extends into an interior portion of the cover 110 when the cover 110 is affixed over the base unit 120. As described above, in certain embodiments, the shearing body 202 may comprise a generally tubular geometry. In such embodiments, the shearing body 202 may have an annular cutting surface 203 disposed around an opening 207 at a distal end 209 of the shearing body 202. The cutting surface 203 may extend perpendicular to the longitudinal axis of the shearing body 202 (e.g., parallel with the axis X). The cutting surface 203 may in certain embodiments, include one or more teeth or sharpened edges shaped for cutting/shearing strands of hair as the cutting surface 203 is rotated.

Figure 2B:
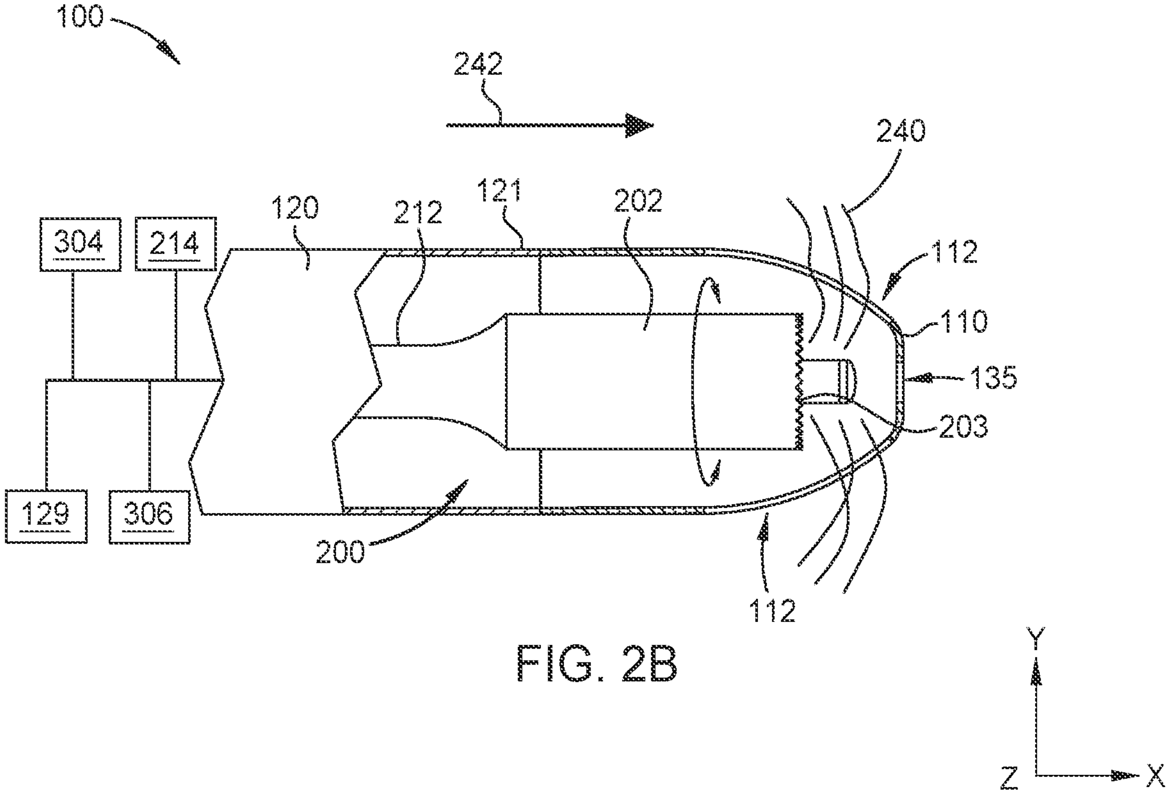
FIG. 2B illustrates a partial cross-sectional side view of the portion of the rotary trimmer configuration depicted in FIG. 2A, during use, according to some embodiments of the present disclosure.

FIG. 2B illustrates a partial cross-sectional side view of the rotary trimmer configuration depicted in FIG. 2A, during use, according to some embodiments of the present disclosure. As the rotary trimmer 100 is introduced to a patient's outer ear, the driver 214 of the shearing assembly 200 may be activated by a user pressing the switch 133 on the outer surface 128 of the base unit 120. When the rotary trimmer 100 is activated, the driver 214 of shearing assembly 200 is configured to rotate or oscillate (either mono- or bi-directionally) the shearing body 202 around the longitudinal axis of the rotary trimmer 100 parallel with the X-axis. The rotation or oscillation of the shearing body 202 causes the cutting surface 203 to move, or gyrate, in a circular motion around the longitudinal X-axis. While the driver 214 is activated and the cutting surface 203 is being gyrated, the user may advance the rotary trimmer 100 toward the outer ear and/or into the ear canal (indicated by arrow 242), which causes ear hairs 240 to pass through the slits 112 of the cover 110 and into the space interior of the cover 110 where the ear hairs 240 are sheared by the cutting surface 203 of the shearing body 202.

While, or after, ear hairs 240 are sheared by the shearing body 202, the resulting loose (e.g., cut) hair pieces may be collected by the rotary trimmer 100 to prevent such hair pieces from entering into the middle ear of the patient in subsequent surgical procedures. In certain embodiments, the hair pieces may be collected via application of vacuum suction by the rotary trimmer 100. In such embodiments and as previously discussed with reference to FIG. 1A, the rotary trimmer 100 may be in fluid communication with a vacuum source 129 via a vacuum line 301 coupled to the one or more ports 123 at the proximal end 125 of the base unit 120 for the generation and application of the vacuum suction. In certain embodiments, the vacuum source 129 may be constantly and/or automatically activated when the shearing assembly 200 of the rotary trimmer 100 is activated. In other embodiments, the vacuum source 129 may be manually and separately activated by the user when using the rotary trimmer 100, such as by pressing a switch or toggle on the exterior of the base unit 120.

When activated, the vacuum source 129 may create a vacuum force that may act upon loose hair pieces through the base unit 120 and the cover 110, resulting in the hair pieces being pulled through the cover 110 and/or the interior of the base unit 120, through the one or more ports 123, and through the vacuum line 301 to the vacuum source 129 for removal. In certain embodiments, the loose hair strands may be suctioned and collected by a catch disposed within the base unit 120. In such embodiments, the catch may comprise a removable collection chamber.

Figure 2C:
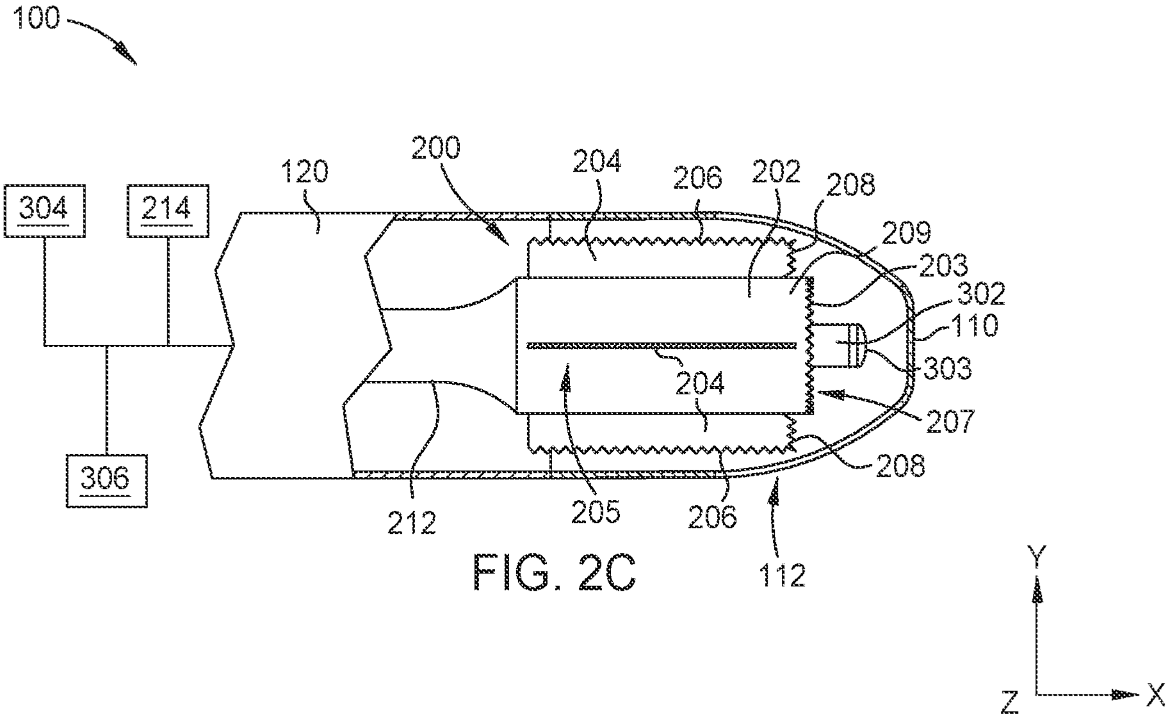
FIG. 2C illustrates a partial cross-sectional side view of a portion of another exemplary configuration of the rotary trimmer depicted in FIGS. 1A-1D, according to some embodiments of the present disclosure.

FIG. 2C illustrates a partial cross-sectional side view of a portion of another exemplary configuration of the rotary trimmer 100, according to some embodiments of the present disclosure. Certain aspects of the configuration of the rotary trimmer 100 depicted in FIG. 2C are similar or substantially similar to those of the configuration depicted in FIGS. 2A and 2B. Accordingly, similar or substantially similar aspects will be omitted in the below description for brevity.

As shown in FIG. 2C, in certain embodiments, in addition or alternatively to the cutting surface 203, the shearing assembly 200 may include one or more lateral blades 204 extending from an exterior surface 205 of the shearing body 202. Each of the one or more lateral blades 204 may comprise at least one of a lateral cutting surface 206 and/or a distal cutting surface 208. The lateral cutting surface 206 may extend parallel to the shearing body 202 and the longitudinal axis of the rotary trimmer 100 (e.g., parallel with the axis X). The lateral cutting surface 206 may thus be configured to cut hairs extending laterally from the slits 112 and into, or towards, the exterior surface 205 of the shearing body 202. Meanwhile, the distal cutting surface 208 may be disposed at a distal end of the lateral blade 204 substantially near the distal end 209 of the shearing body 202. The distal cutting surface 208 may extend perpendicular to the longitudinal axis of the rotary trimmer 100, and may thus be used to cut portions of hairs extending into the slits 112 parallel to the shearing body 202 of the rotary trimmer 100. In still further embodiments, each of the lateral blades 204 may comprise a proximal cutting surface on a surface opposite from, and in certain embodiments, parallel to, the distal cutting surface 208.

Figure 2D:
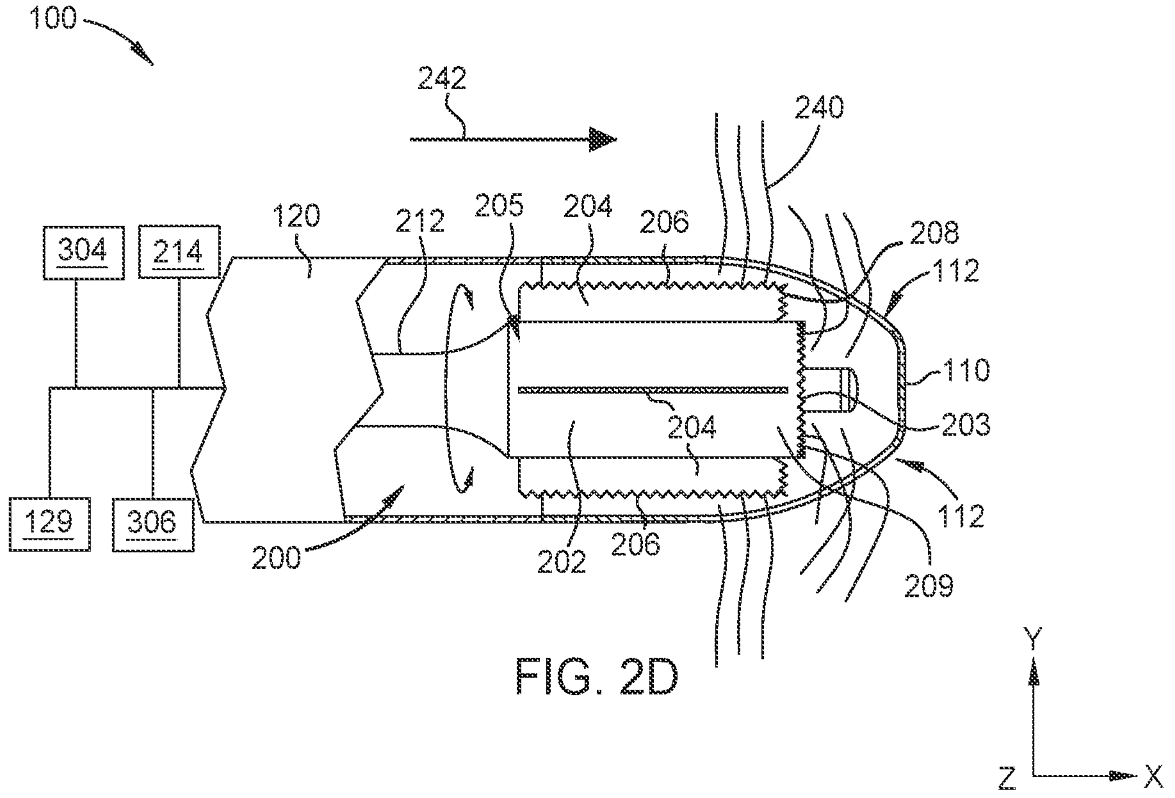
FIG. 2D illustrates a partial cross-sectional side view of the portion of the rotary trimmer configuration depicted in FIG. 2C, during use, according to some embodiments of the present disclosure.

FIG. 2D illustrates a partial cross-sectional side view of the rotary trimmer configuration depicted in FIG. 2C, during use, according to some embodiments of the present disclosure. As shown, when the driver 214 of the shearing assembly 200 is activated and the shearing body 202 is rotated, the user may advance the rotary trimmer 100 toward the outer ear and/or into the ear canal (indicated by arrow 242), which causes ear hairs 240 to pass through the slits 112 of the cover 110 and into the space interior of the cover 110. There, the ear hairs 240 are brought into contact with the cutting surfaces 203, 206, and/or 208, which shear the ear hairs 240. Similar to the example in FIG. 2B, the cut hair pieces may be suctioned and/or collected by the rotary trimmer 100 via the application of a vacuum force by the vacuum source 129 fluidly coupled to the base unit 120.

Figure 3A:
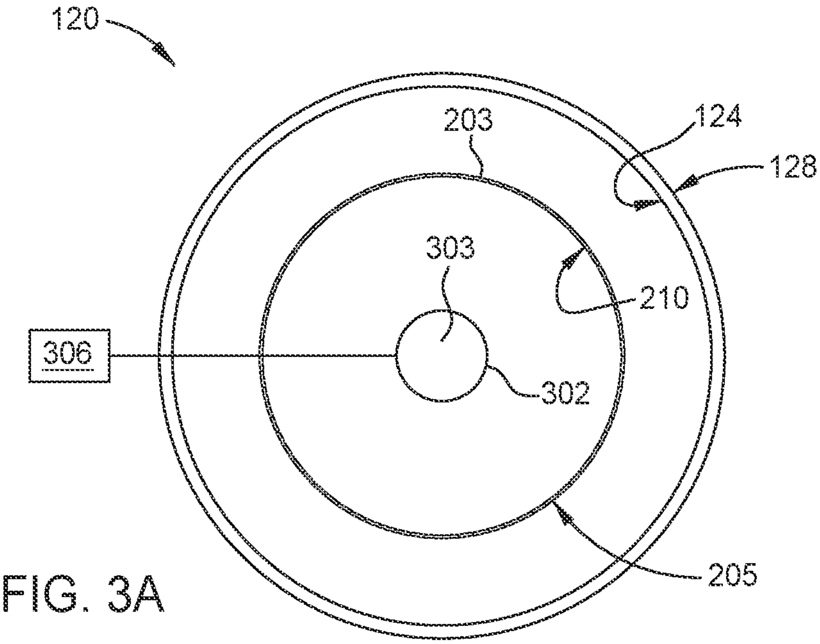
FIG. 3A illustrates a front view of an exemplary configuration of the rotary trimmer depicted in FIGS. 1A-1D, as seen from the section line 3A-5 in FIG. 1D, according to some embodiments of the present disclosure.
Figure 3B:
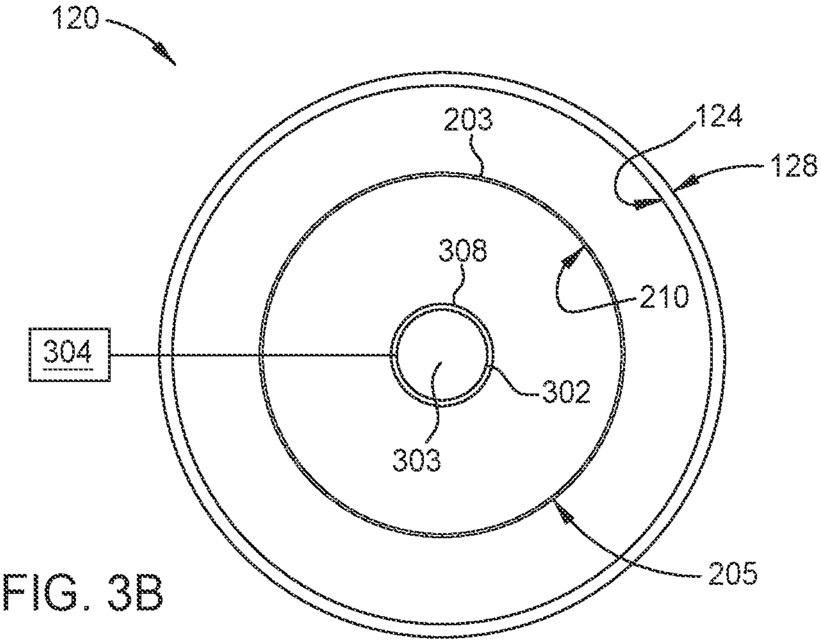
FIG. 3B illustrates a front view of another exemplary configuration of the rotary trimmer depicted in FIGS. 1A-1D, as seen from the section line 3A-5 in FIG. 1D, according to some embodiments of the present disclosure.

Turning now to FIGS. 3A and 3B, front views of the distal end 121 of the base unit 120 of the rotary trimmer 100 are shown. In such embodiments, the optical fiber 302 is disposed concentrically relative to the cutting surface 203 of the shearing assembly 200. The optical fiber 302 may be centrally disposed within the shearing body 202 such that the radial distance between a point on an exterior surface of the optical fiber 302 and an interior surface 210 of the shearing body 202 is uniform around the entire circumference of the optical fiber 302. In the example in FIG. 3A, the optical fiber 302 is an illumination fiber configured to relay and project an illumination light from the distal end 303 of the optical fiber 302. The optical fiber 302 may be a multi-mode end-emitting fiber, a single-mode end-emitting fiber, or the like. The illumination light source 306 may be optically coupled to the optical fiber 302 and may generate the illumination light for transmitting through the optical fiber 302.

In certain embodiments, the optical fiber 302 may extend through the one or more ports 123 of the base unit 120 for connection with the illumination light source 306. Alternatively, the optical fiber 302 may be connected to the illumination light source 306 via a second optical fiber disposed within an optical cable and connected to the optical fiber 302 at, e.g., the one or more ports 123. In certain other embodiments, the illumination light source 306 may be integrated within the base unit 120. The illumination light source 306 may comprise any suitable type of illumination light source, including a violet light source, a blue light source, a white light source, or any other type of light source generating visible light. For example, an LED-based (Light Emitting Diode based) illumination light source 306 may be utilized. In further examples, a xenon- or halogen-based illumination light source 306 may be utilized.

In certain embodiments, the optical fiber 302 has a diameter between about 20 μm and about 120 μm, such as a diameter between about 40 μm and about 100 μm. For example, the optical fiber 302 has a diameter between about 50 μm and about 80 μm. However, smaller or larger diameters are also contemplated.

In the example in FIG. 3B, the optical fiber 302 is an image fiber coupled to camera 304 for facilitating visualization and imaging from within the rotary trimmer 100 through the distal end 303 of the optical fiber 302, including digital visualization and imaging. The camera 304 integrated with optical fiber 302 may be communicatively coupled to an external display to facilitate viewing, by a user, of the imaging feed captured by the camera 304 and relayed by the optical fiber 302. The external display may be connected to the camera 304 and the optical fiber 302 wirelessly or via a wired connection for transmission of the image feed from the camera 304.

In certain embodiments, as depicted in FIG. 3B, the optical fiber 302 may be further disposed within a sleeve 308. The sleeve 308 may couple directly or indirectly to an exterior of the optical fiber 302. The sleeve 308 may act as a tubular structure for providing structural support and alignment of the optical fiber 302 within the base unit 120. In embodiments where the sleeve 308 is directly coupled to the optical fiber 302, an inner surface of the sleeve 308 may have an inner diameter substantially similar to an outer diameter of the optical fiber 302. In certain embodiments, the added rigidity provided by the sleeve 308 enables suspension of the optical fiber 302 within/through the shearing body 202.

Figure 4A:
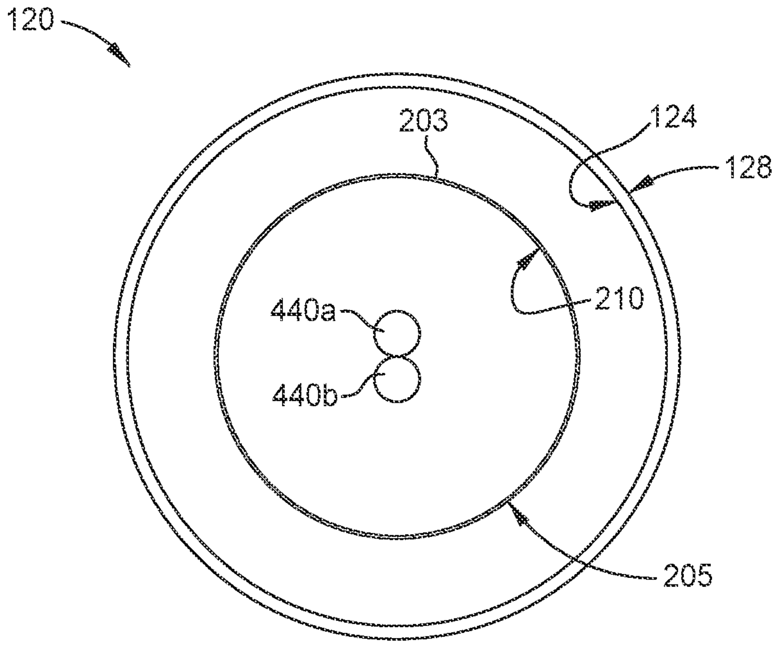
FIG. 4A illustrates a front view of an exemplary configuration of the rotary trimmer depicted in FIGS. 1A-1D, as seen from the section line 3A-5 in FIG. 1D, according to some embodiments of the present disclosure.
Figure 4B:
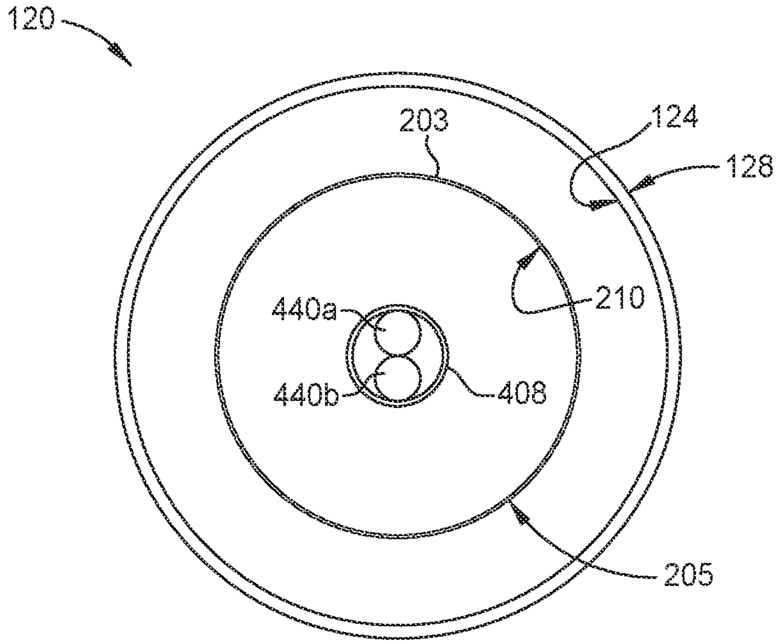
FIG. 4B illustrates a front view of another exemplary configuration of the rotary trimmer depicted in FIGS. 1A-1D, as seen from the section line 3A-5 in FIG. 1D, according to some embodiments of the present disclosure.

FIGS. 4A and 4B illustrate exemplary front views of the distal end 121 of the base unit 120 having at least two optical fibers housed therein. Accordingly, a first optical fiber 440*a* may be configured as an illumination fiber utilized to relay and project an illumination light for illumination of the ear canal space, while a second optical fiber 440*b* may be configured as an image fiber utilized to provide digital visualization and imaging of the same, or vice versa.

In certain embodiments, the first optical fiber 440*a* and the second optical fiber 440*b* may be the same size (e.g. have the same diameter). An example of the first optical fiber 440*a* and the second optical fiber 440*b* formed to be substantially the same size is shown in FIG. 4A for reference. In such embodiments, the first optical fiber 440*a* and the second optical fiber 440*b* may both have a diameter between about 20 μm and about 120 μm, such as a diameter between about 40 μm and about 100 μm. For example, the first optical fiber 440*a* and the second optical fiber 440*b* may both have a diameter between about 50 μm and about 80 μm. In still other embodiments, however, optical fibers 440*a*, 440*b* may each have different dimensions.

In certain embodiments, the optical fibers 440*a*, 440*b* may be coupled together within the base unit 120, such as by being bonded with an adhesive. In other embodiments, the optical fibers 440*a*, 440*b* may be separate and isolated from each other within the base unit 120. As shown in FIG. 4A, the first and second optical fibers 440*a*, 440*b* may be centered within the base unit 120, in certain embodiments, by being disposed within the opening 207 of the shearing body 202. In other embodiments, however, only one of the first and second optical fibers 440*a*, 440*b* may be disposed through the shearing body 202, while the other optical fiber is disposed outside.

As depicted in FIG. 4B, one or both of the first and second optical fibers 440*a*, 440*b* may be optionally disposed within a sleeve 408. Similar to the sleeve 308, the sleeve 408 may provide structural support and containment of the first and/or second optical fibers 440*a*, 440*b* within the rotary trimmer 100. In certain embodiments, a transparent filler material may be used within the sleeve 408 to prevent movement of the first and/or second optical fibers 440*a*, 440*b* within. For example, an adhesive may fill all areas within the sleeve 408 that are not occupied by the optical fibers 440*a*, 440*b*. In other embodiments, one or both of the optical fibers 440*a*, 440*b* are disposed within the sleeve 408 without the utilization of a filler material.

Figure 5:
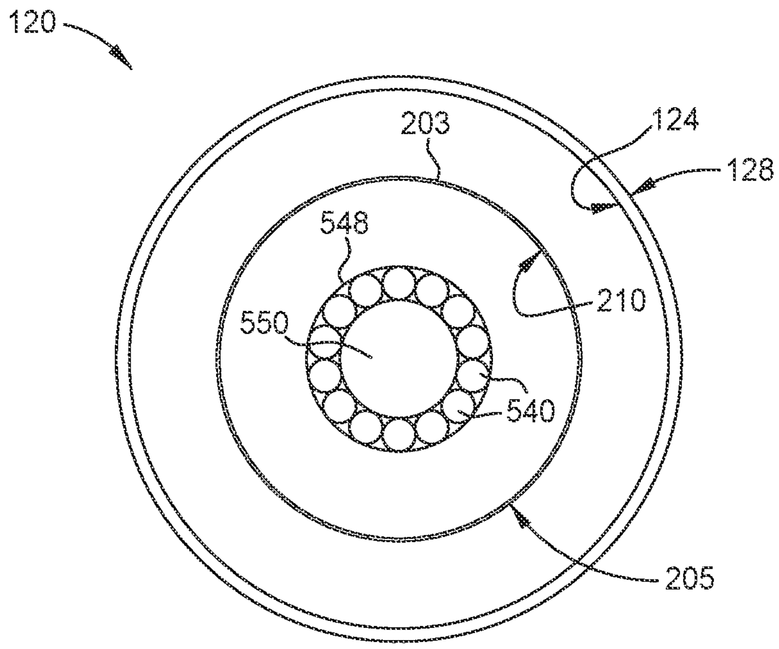
FIG. 5 illustrates a front view of an exemplary configuration of the rotary trimmer depicted in FIGS. 1A-1D, as seen from the section line 3A-5 in FIG. 1D, according to some embodiments of the present disclosure.

FIG. 5 illustrates an exemplary front view of the distal end 121 of the base unit 120 having a first optical fiber 550 and a plurality of second optical fibers 540 surrounding the first optical fiber 550. In the embodiment shown, the single first optical fiber 550 may be configured as an image fiber to provide digital visualization, while each of the plurality of second optical fibers 540 may be configured as illumination fibers to project illumination light.

In the exemplary arrangement of FIG. 5, the single first optical fiber 550 is disposed within the shearing body 202 and circumferentially surrounded by the plurality of second optical fibers 540 along an outer circumference of the optical fiber 550. In other words, a ring of second optical fibers 540 is disposed around and in contact with the first optical fiber 550 such that a center of the fiber 550 is equidistant or at least substantially equidistant from centers of the fibers 540. As shown, the single first optical fiber 550 and the plurality of second optical fibers 540 may all be centrally suspended within the shearing body 202.

In certain embodiments, dimensions of each of the second optical fibers 540 may be smaller than that of the first optical fiber 550 to enable the optical fibers 540, 550 to fit within the space inside the shearing body 202. In another embodiment, the plurality of second optical fibers 540 may be disposed outside of the shearing body 202, such as along the interior surface 124 of the base unit 120. In further embodiments, an optional sleeve 548 may be disposed around the plurality of second optical fibers 540 and configured to tightly hold the second optical fibers 540 against the first optical fiber 550. The sleeve 548 may have any suitable thickness and dimensions to ensure that the second fibers 540 are tightly packed together with no room for the second fibers 540 to be loose or move. The arrangements of the first optical fiber 550 and second optical fibers 540 depicted in FIG. 5 may provide improved illumination of the external ear space during use of the rotary trimmer 100 thereof due to the 360-degree arrangement of the second optical fibers 540 around the first optical fiber 550.

In addition to utilizing different arrangements and numbers of optical fibers within the base unit 120 of the rotary trimmer 100, the relaying of illumination light into the ear canal space of the patient through the cover 110 by illumination fibers and/or the clarity of the imaging obtained by image fibers disposed within the rotary trimmer 100 thereof may be modified by the utilization of different materials for the cover 110. In one aspect, the cover 110 may be formed of materials suitable for insertion into the human ear. As discussed above, the cover 110 may include one or more sections formed of a translucent or transparent material to enable the projecting of light and/or imaging through the cover 110. In certain embodiments, the distal tip 111 of the cover 110 may be formed of a translucent or transparent material while the remaining portion of the cover 110 is formed of an opaque metal or plastic material. In other embodiments, the cover 110 may be entirely formed of a translucent or transparent material.

In summary, embodiments of the present disclosure include instruments for use with neurotologic surgical procedures, and more particularly, shearing instruments for shearing ear canal hairs and having combined shearing, illuminating, and vacuuming functions. In particular, the instruments described above are configured to shear and vacuum ear canal hair, and may be used prior to the performance of a TEES procedure to avoid the risk of ear canal hairs entering into the middle ear during the TEES procedure and causing infection and/or inflammation of the middle ear. Furthermore, the propagating of illumination light by the described instruments enables enhanced visualization of the ear canal during inspection and removal of hair therefrom. Still further, in certain embodiments described herein, the instruments may facilitate digital visualization and imaging functions to assist in the inspection and removal of hair from the ear canal. Digital visualization and imaging functions may also be implemented as part of a safety or feedback mechanism in the instrument to prevent inadvertent contacting and damage to the tympanic membrane when using the shearing instrument in patients.

Utilization of the instruments described herein therefore allows hairs to be efficiently, safely, and thoroughly removed from the ear canal prior to TEES procedures, as well as enable surgeons to perform TEES procedures without the need of an ear speculum. Eliminating the need for an ear speculum reduces the number of instruments needing to be held by the surgeon during TEES procedures and also provides the surgeon more space in the ear canal to work. Accordingly, the described embodiments enable the performance of more efficient, less invasive, and safer neurotologic surgical procedures.

Although neurotologic surgery is discussed as an example of a surgical procedure that may benefit from the described embodiments, the advantages of the instrument described herein may benefit other surgical procedures as well.

While the foregoing is directed to embodiments of the present disclosure, other and further embodiments of the disclosure may be devised without departing from the basic scope thereof, and the scope thereof is determined by the claims that follow.

What is claimed is:

1. A rotary trimmer, comprising:
- a base unit configured to be held by a user, the base unit comprising an opening at a distal end of the base unit;
- a cover removably coupled to the opening, the cover comprising a plurality of slits near a distal end of the cover;
- a shearing assembly at least partially disposed within the base unit, the shearing assembly comprising:
  - a blade;
  - a rotor coupled to the blade; and
  - a driver configured to rotate the rotor, wherein rotating the rotor causes gyration of the blade;
- one or more optical fibers disposed within the base unit and configured to facilitate visualization of an external space distal to the cover; and
- a port disposed at a proximal end of the base unit, the port configured to be in fluid communication with a vacuum line.

2. The rotary trimmer of claim 1, wherein at least one of the one or more optical fibers is configured to project an illumination light.

3. The rotary trimmer of claim 1, wherein at least one of the one or more optical fibers is optically coupled with a camera at a distal end of the at least one of the one or more optical fibers.

4. The rotary trimmer of claim 1, wherein the one or more optical fibers comprise one or more illumination fibers configured to propagate illumination light to the external space and one or more image fibers configured to capture and propagate images to a visualization system.

5. The rotary trimmer of claim 3, wherein at least one of the one or more optical fibers is configured as a proximity sensor to detect one or more sensitive surfaces inside an ear canal space and to monitor a distance between the distal end of the cover and the one or more sensitive surfaces.

6. The rotary trimmer of claim 5, further comprising a safety feedback feature to provide an audible and/or a visual notification to a user upon the proximity sensor detecting that the distal end of the cover is within a minimum threshold distance to the one or more sensitive surfaces inside the ear canal space.

7. The rotary trimmer of claim 5, further comprising a safety feedback feature to disable the shearing assembly upon the proximity sensor detecting that the distal end of the cover is within a minimum threshold distance to the one or more sensitive surfaces inside the ear canal space.

8. The rotary trimmer of claim 7, wherein after the shearing assembly has been disabled by the safety feedback feature, the rotary trimmer is configured to automatically reactivate the shearing assembly upon the proximity sensor detecting that the distal end of the cover is outside the minimum threshold distance.

9. The rotary trimmer of claim 1, wherein the cover further comprises one or more sections formed of a translucent or transparent material to facilitate transmission of light therethrough.

10. The rotary trimmer of claim 1, wherein the blade comprises a cylindrical body having a proximal end and a distal end, wherein the proximal end of the cylindrical body is coupled to the rotor, and wherein the distal end of the cylindrical body comprises a cutting surface formed along a circumferential edge of an opening at the distal end of the cylindrical body.

11. The rotary trimmer of claim 10, wherein the blade further comprises a hollow cavity extending from the proximal end of the cylindrical body to the opening at the distal end of the cylindrical body, and wherein the one or more optical fibers are concentrically disposed within the hollow cavity relative to the cutting surface of the cylindrical body.

12. The rotary trimmer of claim 1, wherein the blade comprises a cylindrical body and one or more lateral blades extending laterally from an exterior surface of the cylindrical body, wherein each of the one or more lateral blades includes a lateral cutting surface disposed parallel with the exterior surface of the cylindrical body.

13. The rotary trimmer of claim 12, wherein each of the one or more lateral blades further comprise a distal cutting surface at a distal end of each of the one or more lateral blades, wherein the distal cutting surface extends perpendicular with the exterior surface of the cylindrical body.

14. The rotary trimmer of claim 1, further comprising the vacuum line for fluidly coupling the port to a vacuum source.

* * * * *